United States Patent [19]
Davidow et al.

[11] Patent Number: 5,303,057
[45] Date of Patent: Apr. 12, 1994

[54] UNIVERSAL PROJECTION TELEVISION CABINET

[75] Inventors: Emily A. Davidow; Robert L. Davidow, both of Leawood, Kans.

[73] Assignee: Benchmark Industries, Incorporated, Lenexa, Kans.

[21] Appl. No.: 56,247

[22] Filed: Apr. 30, 1993

[51] Int. Cl.$^5$ .............................................. H04N 5/64
[52] U.S. Cl. .................................... 348/836; 312/7.2; 312/205
[58] Field of Search ................. 358/254; 312/7.2, 205, 312/211

[56] References Cited

U.S. PATENT DOCUMENTS

| | | | |
|---|---|---|---|
| 3,977,742 | 8/1976 | Rovere | 312/111 |
| 4,002,831 | 1/1977 | Aeschliman | 358/254 |
| 4,053,192 | 10/1977 | Spetner | 312/111 |
| 4,602,826 | 7/1986 | Zimmer | 312/111 |
| 4,660,901 | 4/1987 | Shimada | 312/111 |
| 4,974,386 | 12/1990 | Eriksson et al. | 312/111 |

Primary Examiner—Edward L. Coles, Sr.
Assistant Examiner—Thomas L. Stoll
Attorney, Agent, or Firm—Hovey, Williams, Timmons & Collins

[57] ABSTRACT

Cabinet structure 10/12 for universally receiving television sets 20/66 of varying sizes and including, in one embodiment, spaced apart towers 14 and 16 and in a second embodiment, towers 52 and 54, there being adjustable means spanning the area between the spaced apart towers and including a face plate 72, a shelf 74 and a trim strip 76, each having relatively shiftable portions whereby the overall length thereof may be regulated by shifting the portions so that they correspond essentially to the width of the area and of the television set received therein whereby the set is closely enclosed by the cabinet components.

13 Claims, 5 Drawing Sheets

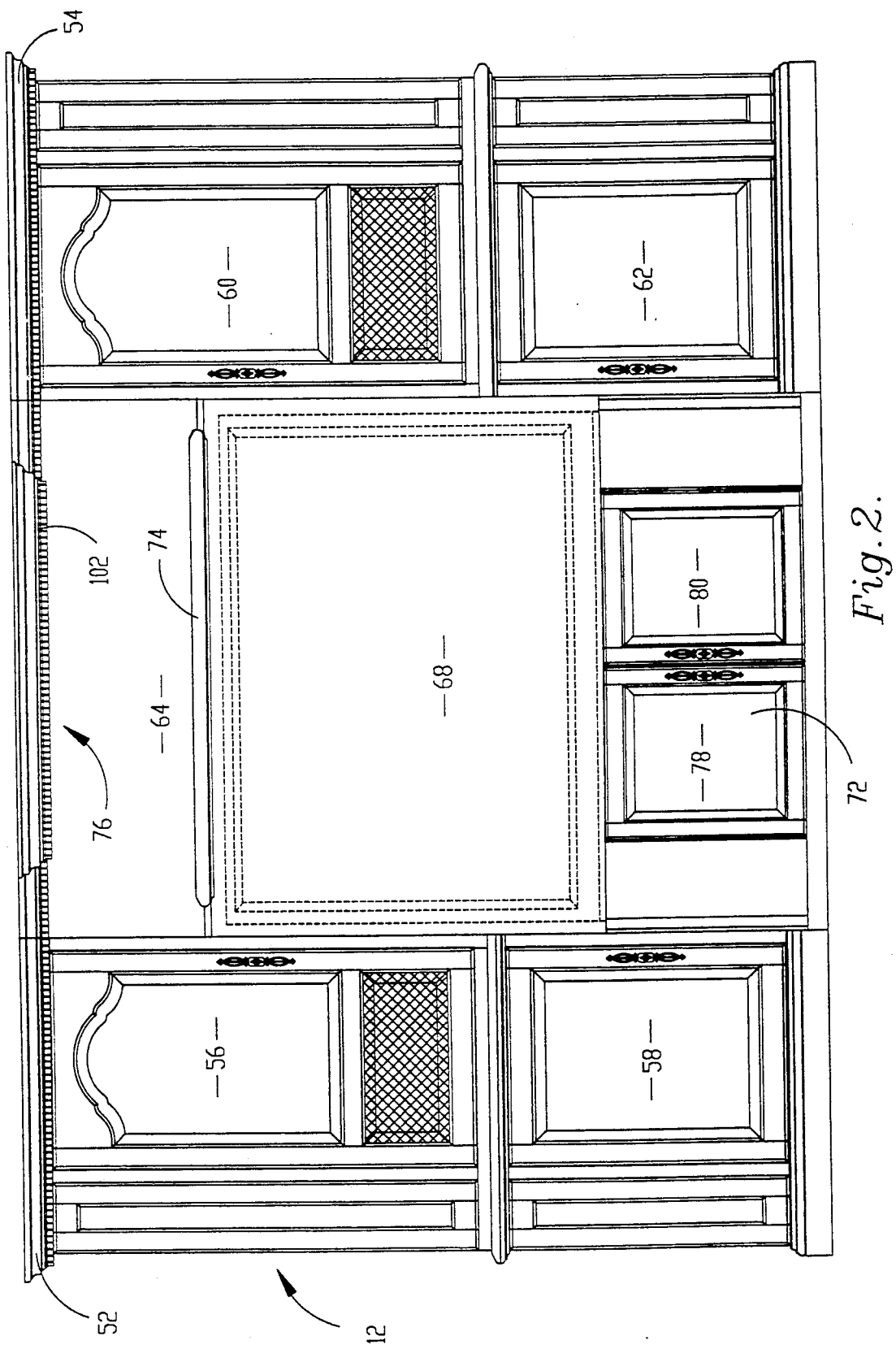

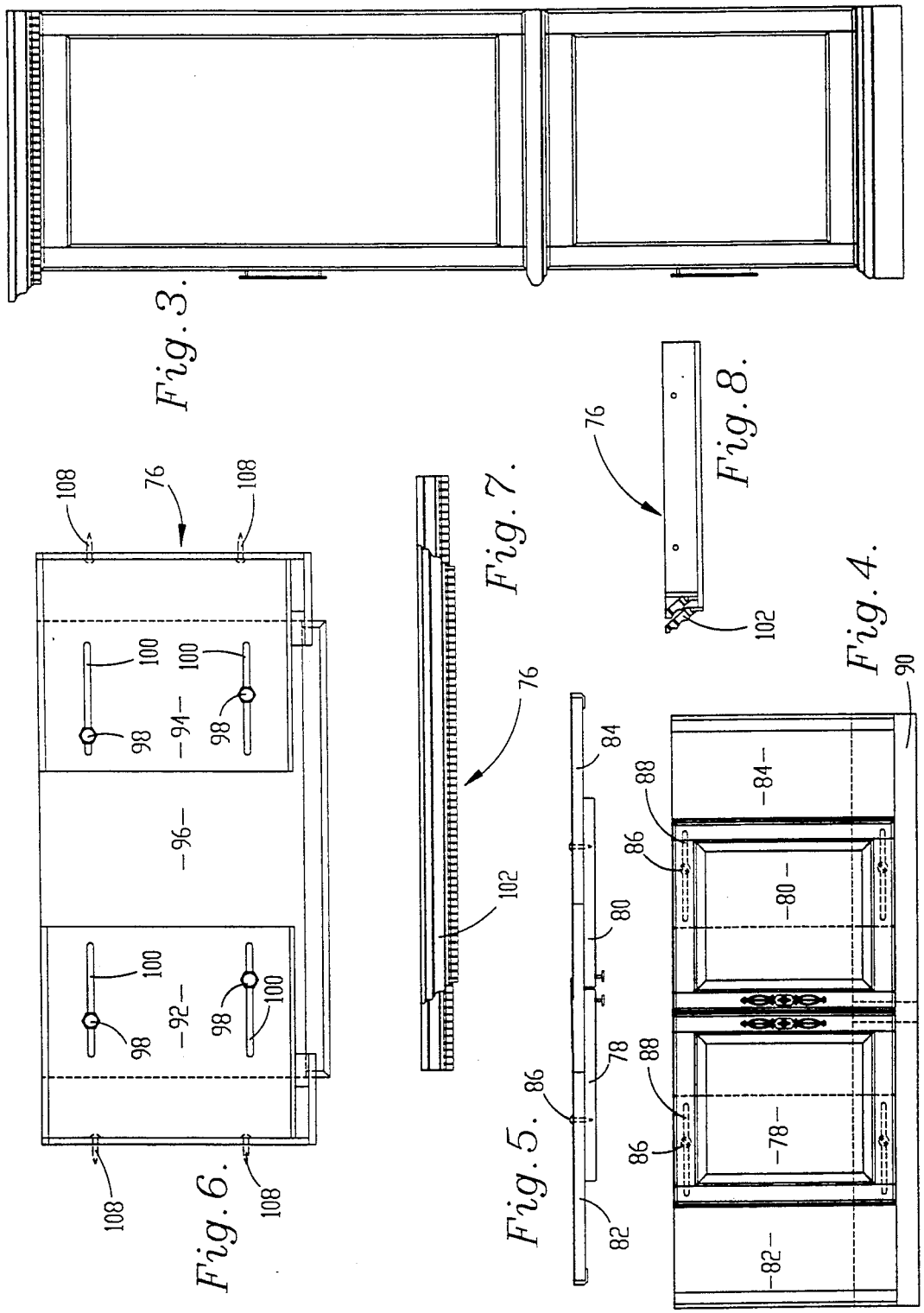

UNIVERSAL PROJECTION TELEVISION CABINET

BACKGROUND OF THE INVENTION

1. Field of the Invention

The present invention is concerned with furniture cabinets in the nature of home entertainment centers which are intended particularly to receive television sets of varying types and sizes whereby to enclose the sets within the furniture cabinet in order to present an overall aesthetically pleasing appearance and to hide certain functional components of the television set but yet display the viewing screen.

It is the primary object of this invention to provide a cabinet for receiving, in addition to direct view television sets, the newer and larger projection televisions and to accommodate sets of both types notwithstanding the fact that the same have varying widths and heights when furnished by the manufacturer.

The invention particularly relates to cabinet structure for receiving a television set which has a fixed height and width, the structure including a pair of opposed, spaced apart towers which define a television set receiving area therebetween, there being adjustable means in the form of shelves, light bars and face plates and spanning the area between the towers whereby to support the television set within the area in an aesthetically pleasing fashion and in such a manner that all of the television set except the viewing screen thereof is covered by the cabinet work.

The adjustable means each have relatively shiftable portions whereby they may be readily adjusted by the user of the cabinet to span the distance between the towers, which is normally essentially the same as the width of the television set to be placed in the area, the adjustment of the shiftable portions determining the overall length of the means and ensuring that the cabinet structure will snugly enclose the television set in the most desirable fashion. Likewise, the adjustable means may be positioned within the area between the towers to appropriately accommodate television sets having various heights and to enclose a set of a given height in such a manner that it is pleasantly presented in aesthetically pleasing surroundings furnished by the cabinet structure.

DESCRIPTION OF THE PRIOR ART

It has been known to provide entertainment centers for homes which consist of a pair of spaced apart towers which have an area therebetween to accommodate a television set with shelves being provided above and/or below the set when it is positioned within the area between the towers.

Unfortunately, however, the entertainment centers fail to provide means which are adjustable so that the entire entertainment center may be accommodated to receive a set of a given height and width and to enclose the set in such a manner that it is made to appear as a built in portion of the entertainment center, notwithstanding the fact that it is an independently furnished item.

The previously known cabinet structure, while it has been used to receive a television set, is not capable of totally surrounding the set, both at the sides, the top and the bottom, in such a manner that the undesirable components of the set are not visible to the user of the entertainment center, while permitting the viewing screen to be seen without any of its attendant components.

SUMMARY OF THE INVENTION

The present universal projection television cabinet structure presents a home entertainment center capable of receiving television sets of any height or width and enclosing the set within the cabinet structure in such a manner that only the viewing screen of the television is visible, the remaining components being hidden by portions of the cabinet structure.

The cabinet structure includes a pair of spaced apart towers defining a television set receiving area therebetween and adjustable means connected with each of said towers and spanning the area between the towers whereby the spaced distance between the towers may be determined by adjustment of the means whereby to accommodate a television set of any width and snugly enclose the same between the towers. Each of the adjustable means, whether it be a shelf, a trim strip, light bar or face plate, has relatively shiftable portions whereby the user may readily adjust the length thereof and thus the distance between the towers to initially size the cabinet structure to receive the television set to be displayed therein.

The provision of a pair of towers and adjustable means for interconnecting the towers and determining the width of the area therebetween enables a seller of home entertainment centers to provide universal cabinet structure which will receive television sets of virtually any height or width, thereby eliminating the necessity of maintaining a large inventory of cabinet structures, each particularly intended to receive a television set of given dimensions.

The cabinet structure also includes means for accommodating speakers provided apart from the television set and also presents facilities for receiving additional entertainment media components within the towers.

BRIEF DESCRIPTION OF THE DRAWINGS

FIG. 2 is a front elevational view of a universal cabinet structure particularly intended to receive a projection television set;

FIG. 3 is an end elevational view of the cabinet structure of FIG. 2;

FIG. 4 is a front elevational view of the face plate shown in FIG. 2 and illustrating the means of adjusting the overall length thereof;

FIG. 5 is a top plan view of the face plate shown in FIG. 4;

FIG. 6 is a top plan view of the trim strip normally adjacent the top of the cabinet and showing the means for adjusting the same;

FIG. 7 is a front elevational view of the trim strip shown in FIG. 6; and

FIG. 8 is an end elevational view thereof.

DESCRIPTION OF THE PREFERRED EMBODIMENT

Figure 1:
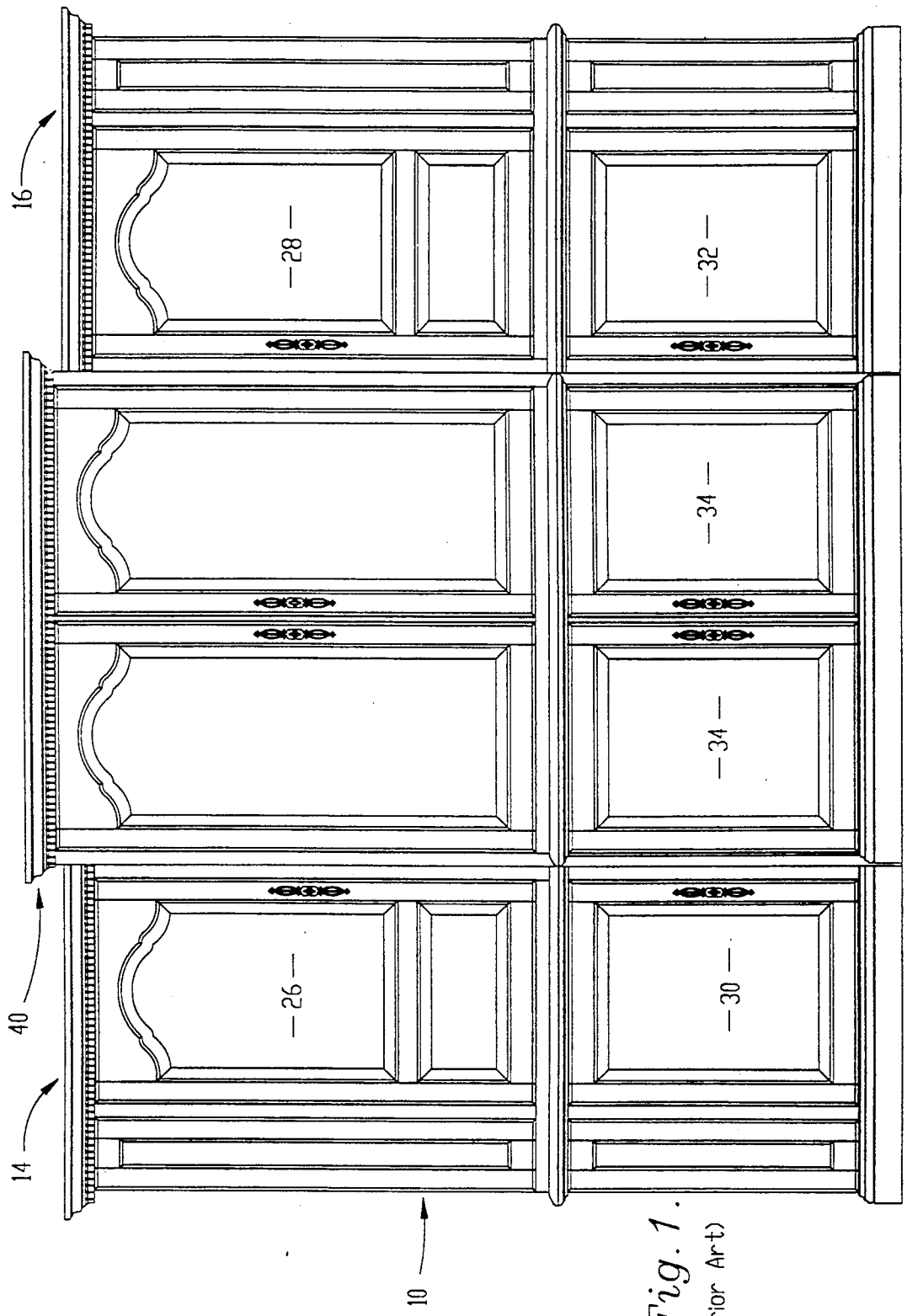
FIG. 1 is a front elevational view of the cabinet structure of the present invention intended to receive a direct view television set therewithin.

The television cabinet receiving structure may be in the form particularly shown in FIG. 1 and identified as 10, intended to receive a direct view television set as contrasted with a projection television set, a direct view set normally being of smaller dimensions overall than a projection television.

The cabinet structure illustrated in FIG. 2 and identified as 12 is particularly intended to receive a projection television set which is of greater size than the ordinary direct view television.

Figure 1A:
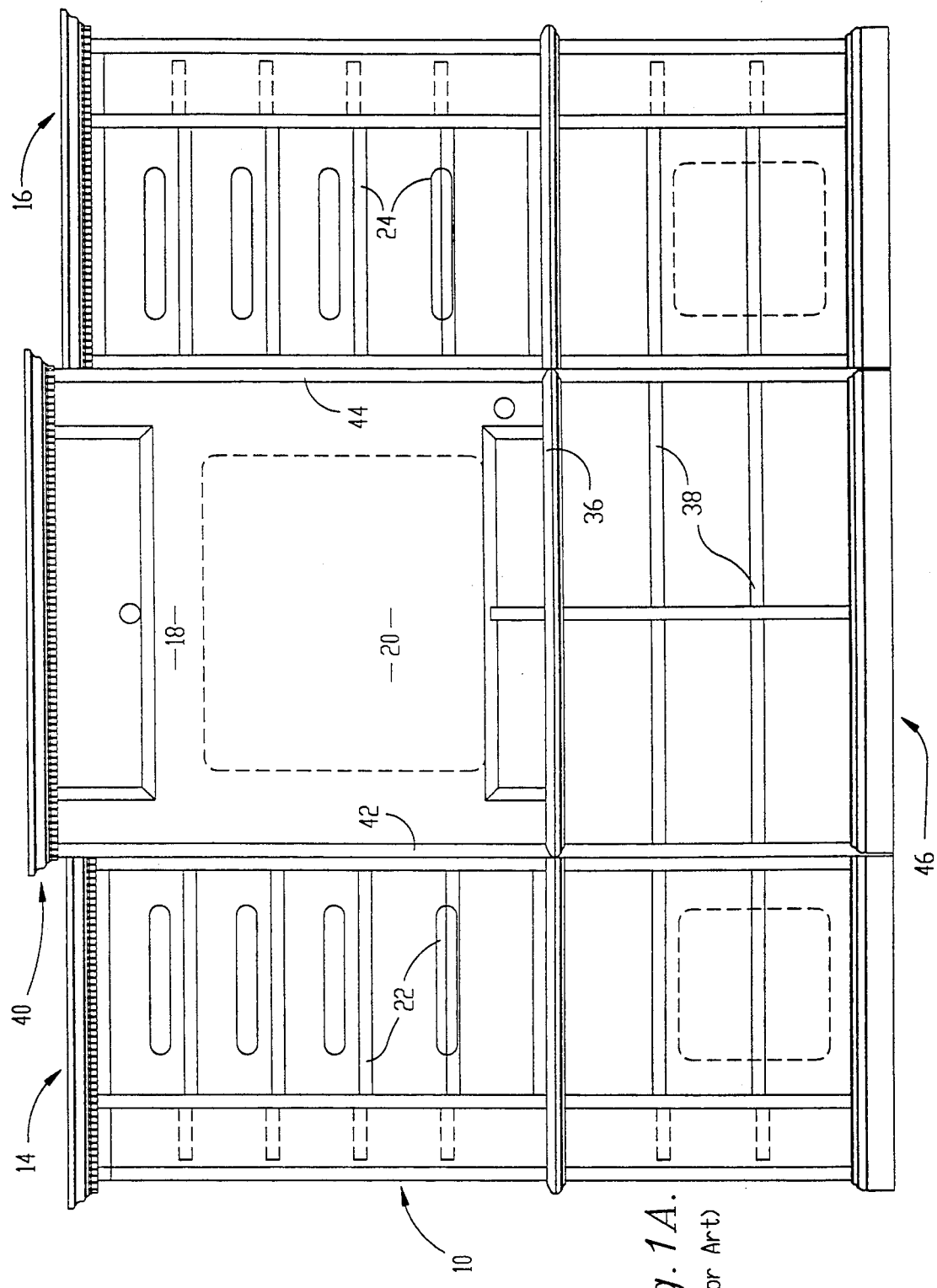
FIG. 1A is a front elevational view comparable to FIG. 1 but with the covering doors and other front facia removed from the cabinet structure.

The structure 10 illustrated in FIG. 1 and also in FIG. 1A, is generally conventional in construction in that it includes a pair of spaced apart towers 14 and 16 presenting an area 18 therebetween, the area 18 being intended, in the case of the structure shown in FIGS. 1 and 1A, to receive a direct view television set 20.

The towers 14 and 16 of cabinet structure 10 are each provided with a plurality of shelves 22 and 24 respectively, which may be vertically positionable within their corresponding towers 14 and 16. Said towers 14 and 16 are each also provided with normally uppermost doors 26 and 28 respectively, and lower doors 30 and 32 for gaining access to the interior of the corresponding towers 14 and 16 and thereby access to the shelves 22 and 24, respectively.

Viewing FIG. 1, there is presented a pair of center doors 34 which are positioned normally directly below the area 18 defined by the towers 14 and 16 and also a shelf 36 which overlies the center doors 34 and its corresponding cabinet components such as shelves 38.

A trim strip 40 spans the distance between the towers 14 and 16 at the uppermost ends thereof and completes the enclosure of the area 18 between trim strip 40, shelf 36 and the outer walls 42 and 44 of the central cabinet component 46.

The direct view television set 20 is positioned within area 18. It will be appreciated that, within the concept of this invention, the components constituting central cabinet 46 may be adjustable in width whereby to draw in the walls 42 and 44 to closely embrace or enclose the sidewalls of the direct view television set 20. Likewise, the trim strip 40 could be lowered to more closely approach the top wall of the television set whereby the set would be totally enclosed within the cabinet 10 except for the viewing screen portion of the television set.

A home entertainment center in the nature of a television cabinet such as 10, having fixed components; that is,, there are no adjustable means to accommodate television sets of various widths or heights, is presently known, but is unsatisfactory since the area 18, for instance, in a home entertainment center such as shown in FIGS. 1 and 1A, is of a fixed dimension and the defining portions thereof are not adjustable so that the television set is presented in an appearance such as shown in FIG. 1A with the screen of the set not tightly enclosed by the components of the cabinet, this being undesirable from an aesthetic point of view.

To overcome this deficiency, the television cabinet as illustrated in FIGS. 1 and 1A may be provided with adjustable means between the towers 14 and 16, connected therewith and having shiftable portions whereby to regulate the overall size of the area 18 and ensure that the direct view television set is tightly accommodated within the area where only the screen is seen.

Such cabinet structure is illustrated in detail in FIGS. 2-8 and is described as follows.

Here again, the cabinet structure 12 incorporates a pair of spaced apart towers 52 and 54 which are pieces of furniture having doors thereon, tower 52 being provided, for instance, with upper door 56 and lower door 58, and tower 54 being provided with upper door 60 and lower door 62. The area 64 between the towers receives a projection television set such as 66 shown in FIG. 2A, which television set is totally independent from the towers 52 and 54 and normally rests upon the floor which also supports the towers 52 and 54.

The projection television set includes a viewing screen 68 and functional components 70 and is normally much larger than a direct view television set, a projection television, for instance, having screens ranging from 40 inches to 60 inches in size.

Given the various sizes of projection television sets such as 66 and the desire to aesthetically present the same in a home entertainment center, it is desirable to having the television sets snugly enclosed within the cabinet components of the entertainment center. It is also desirable, from a furniture maker or retailer's standpoint, to be able to provide cabinet structure which is capable of receiving projection television sets of rather widely varying sizes, without having to specifically size the cabinet structure for each individual size of television set.

To create such universal structure, there is provided, in the area 64 between the towers 52 and 54, adjustable means connected with each of the towers and spanning the area between the towers whereby the space between the towers may be determined by adjustment of the means to thereby ensure that the towers are spaced apart a distance essentially similar to the width of the projection television to be received within the area 64.

Figure 2A:
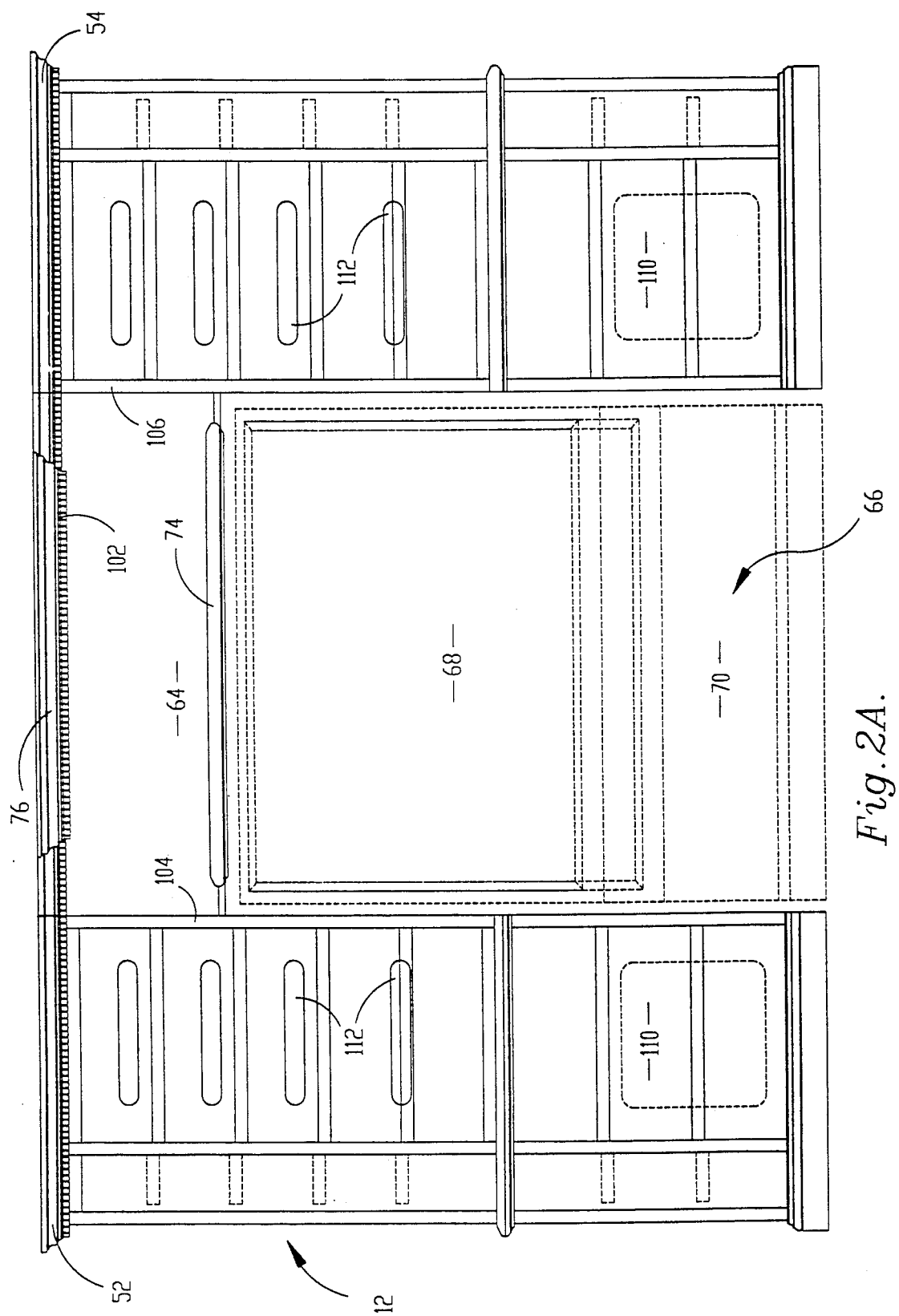
FIG. 2A is a front elevational view comparable to FIG. 2 but with the covering doors and other front facia removed from the cabinet structure.

In the construction illustrated in FIGS. 2 and 2A, for instance, and since the television set itself rests upon the floor within the area 64, the adjustable means includes a lowermost face plate 72 which is adjacent the lower portion of the projection television set, this normally being the functional components 70 which are not desirably viewed in the home. Additional details of the face plate 72 are shown in FIGS. 4 and 5.

The next adjustable means is in the form of a shelf 74 which is positioned directly above the top of the television set and serves to complete the enclosure thereof between the towers 52 and 54 and the face place 72. The shelf 74 is adjustable in overall length and is connected at each of its ends to corresponding towers 52 and 54. The shelf may normally be used to support decorative items above the television set.

The uppermost ends of the towers 52 and 54 are desirably connected by a trim strip or light bar 76 which likewise is adjustable in its overall length and is connected at each of its ends to corresponding towers 52 and 54; further details of the trim strip or light bar 76 being shown in FIGS. 6-8.

When the various adjustable means are selectively positioned as, for instance, illustrated in FIG. 2, there is provided cabinet structure which receives the projection television set or, for that matter, a direct view television set, and presents the viewing screen thereof in an attractive and aesthetically pleasing manner so that the entire cabinet structure constituting the entertainment center may not only create an attractive appearance but may also be adjustable in overall width to fill the smallest possible area in the room in which it is positioned.

To permit the foregoing, the face plate 72, for instance, constitutes a pair of false doors 78 and 80, which each have corresponding filler plates 82 and 84 slidable connected therewith so that they may be reciprocated by means of screws 86 which ride in slots 88 provided correspondingly in the filler plates 82 and 84 as illustrated, f or instance, in FIGS. 4 and 5. A lower cove portion 90 is positioned beneath the doors 78 and 80 and the filler plates 82 and 84 and provides support therefor as well as spacing the same from the floor upon which the television set 66 is supported.

The top trim strip or light bar 76 is likewise adjustable in overall length and, for this purpose, includes a pair of shiftable members 92 and 94 reciprocally carried by a center sheet 96. The center sheet 96 has pins 98 therein which ride in slots 100 formed in the shiftable members 92 and 94 whereby the distance between the opposed ends of the trim strip 76 may be adjusted to accommodate the same to the width of the television set and also the width of the area 64, these being essentially identical, and thereby provide a top closure for the area which is similar in configuration and appearance, for instance, to that of the tops of the two towers 52 and 54, as illustrated in FIG. 2. Thus a decorative facia such as 102 may be provided on the front edges of both the center sheet 96 and the shiftable members 92 and 94 whereby, even when the members are extended outwardly, a common and continuous appearance is created.

It will be appreciated from the foregoing that when it is desired to position a television set of any type within cabinet structure such as described above and constituting a home entertainment center, it is only necessary to provide the two towers to be spaced apart and, only in addition thereto, adjustable means for spanning the area defined by the spacing of the two towers, which is comparable in width to that of the television set to be displayed. In the case of a direct view television, this could constitute an adjustable shelf and adjustable face plate structure and, if desired, a top trim strip structure. Likewise, in the case of a projection television, in addition to the two towers, it would only be necessary to provide the adjustable face plate 72; a shelf 74, if desired, and a top trim strip 76.

In assembling the components, the television set would be placed in its desired position upon the floor and the towers moved in snugly against the opposite sides of the set, as illustrated in FIGS. 2 and 2A, for instance. The face plate 72 would then be adjusted in length to correspond to the width of the television set and inserted between the towers and in front of the functional components 70 of the projection television 66. It is also within the concept of this invention to provide means for vertically adjusting the size of the face plate 72 so that the height thereof might be adjustably determined, depending upon the height of the functional components 70 of the projection television 66. Once sized, the face plate 72 can then be inserted between the towers 52 and 54 and suitably connected therewith as by screws or the like.

Next, if it is desired, a shelf such as 74 may be adjusted in length by relatively shifting the portions thereof to create an overall length similar to the width of area 64 and then connecting the ends of the shelf to the inner walls of the towers, thus providing a display area over the top of the television set. The structure of shelf 74 could be comparable in nature to that of the trim strip 76, as illustrated in FIG. 6, to thereby permit the ready adjustability of the shelf 74.

The top trim strip or light bar may also be adjusted to accommodate it to the width of the area 64 and, once this has been accomplished, as described above and by utilizing the structure illustrated in FIGS. 6–8, the trim strip 76 can be secured to the inner walls 104 and 106 of the towers 52 and 54 respectively by means of screws 108, such as illustrated in FIG. 6.

It is also contemplated that the towers 52 and 54 will have means for accommodating remote speakers for the television set such as by providing an opening 110 in the rear wall of each of the towers 52 and 54 to receive subwoofer speakers.

Likewise, the towers are each provided with a plurality of shelves 112 which may be selectively vertically positioned to accommodate additional entertainment media components such as speakers, VCR's, amplifiers, etc., also providing room for storage of cassettes, tapes, discs, and the like.

Once the universal cabinet structure has been designed, it will be appreciated that, except for varying decorative furniture finishes or embellishments, the basic components can continuously be the same and it is not necessary to provide a large number of variable sized cabinet structures to particularly accommodate television sets of varying sizes. Also further economizing the structure is the fact that a prewired cable harness may be utilized in the wiring of the cabinet structure.

Thus there is provided universal television cabinet structure, particularly intended to accommodating projection television sets, which has limited basic components but which includes adjustable means whereby the universality of the structure may be maintained and the cabinet enabled to accommodate, receive and display television sets of a multitude of sizes.

We claim:

1. Cabinet structure for receiving a television set having a fixed height and width, the structure comprising:
    a pair of spaced apart towers defining a television set receiving area between the towers;
    a spacing means spanning the towers for determining the horizontal distance between the towers, the spacing means including a pair of relatively shiftable end members, whereby the length of the adjustable spacing means may be regulated by shifting said end members with respect to one another to vary the size of the television set recieving area in order to accommodate television sets of different widths; and
    an attachment means for connecting the spacing means with each of said towers.

2. Cabinet structure for enclosing a television set as set forth in claim 1, wherein a plurality of said adjustable spacing means are positioned at spaced vertical intervals between said towers.

3. Cabinet structure for enclosing a television set as set forth in claim 1, wherein said adjustable spacing means includes a central member and a pair of opposed end members, the end members being shiftable relative to the central member in order to adjust the length of the spacing means, each of said opposed end members being connected with one of the towers.

4. Cabinet structure for enclosing a television set as set forth in claim 2, wherein the normally adjusted length of each of aid adjustable spacing means corresponds essentially to the width of the television set received in said area.

5. Cabinet structure for enclosing a television set as set forth in claim 4, wherein the adjustable spacing means are provided at least adjacent the upper portion and the lower portion of the television set.

6. Cabinet structure for enclosing a television set as set forth in claim 5, wherein said adjustable spacing means and said towers combine to enclose the top and sides of the television set when the set is positioned within said area.

7. Cabinet structure for enclosing a television set as set forth in claim 6, wherein said adjustable spacing means adjacent the lower portion of the television set includes a shelf for supporting the television set within the area.

8. Cabinet structure for enclosing a television set as set forth in claim 6, wherein said adjustable spacing means adjacent the lower portion of the television set includes a face plate for concealing the lower portion of the television set below the viewing screen.

9. Cabinet structure for enclosing a television set as set forth in claim 8, wherein said adjustable means includes a shelf above the television set.

10. Cabinet structure for enclosing a television set as set forth in claim 9, wherein said adjustable spacing means also includes a top trim member normally connected the uppermost ends of the towers and being positioned above said shelf and the television set.

11. Cabinet structure for enclosing a television set as set forth in claim 6, wherein each of said towers includes space therein for recieving speakers for said television set when received in said area.

12. Cabinet structure for enclosing a television set as set forth in claim 11, wherein each of said towers includes an opening in the rear side of the tower for accommodating certain of said speakers.

13. Cabinet structure for enclosing a television set as set forth in claim 12, wherein each of aid towers includes a storage means for receiving additional entertainment media components.

* * * * *

UNITED STATES PATENT AND TRADEMARK OFFICE
CERTIFICATE OF CORRECTION

PATENT NO. : 5,303,057  
DATED : April 12, 1994  
INVENTOR(S) : Davidow, et al

Page 1 of 2

It is certified that error appears in the above-indentified patent and that said Letters Patent is hereby corrected as shown below:

On the title page, line 56, under the column heading "References Cited", add the following:

| | | | |
|---|---|---|---|
| --2,304,490 | 12/1942 | Yoder | 358/254 |
| 2,643,083 | 6/1953 | Troutman | 248/129 |
| 2,664,258 | 12/1953 | Lanier | 248/172 |
| 2,698,152 | 12/1954 | Kaye | 248/149 |
| 2,806,754 | 9/1957 | Abeles et al. | 312/7 |
| 3,467,455 | 9/1969 | Caldemeyer | 312/7 |
| 3,672,741 | 6/1972 | Clark | 312/223 |
| 3,930,701 | 1/1976 | Otakie | 312/244 |
| 4,193,650 | 3/1980 | Gray et al. | 312/205 |
| 4,223,967 | 9/1980 | Royer | 312/245 |
| 4,273,395 | 6/1981 | Martinez et al. | 312/205 |
| 4,669,790 | 6/1987 | Briggs | 312/208 |
| 4,861,121 | 8/1989 | Gotz | 312/208-- |

UNITED STATES PATENT AND TRADEMARK OFFICE
CERTIFICATE OF CORRECTION

PATENT NO. : 5,303,057
DATED : April 12, 1994
INVENTOR(S) : Davidow, et al

It is certified that error appears in the above-indentified patent and that said Letters Patent is hereby corrected as shown below:

On title page, item [30] Foreign Patents, add the following:

--303847               2/1955               Switzerland.--

Signed and Sealed this

Eighteenth Day of October, 1994

Attest:

BRUCE LEHMAN

*Attesting Officer*        *Commissioner of Patents and Trademarks*

UNITED STATES PATENT AND TRADEMARK OFFICE
CERTIFICATE OF CORRECTION

PATENT NO. : 5,303,057
DATED : April 4, 1994
INVENTOR(S) : Davidow et al.

Page 1 of 1

It is certified that error appears in the above-identified patent and that said Letters Patent is hereby corrected as shown below:

Column 6,
Line 40, cancel the text beginning with "1. Cabinet structure" to an ending "said towers" in column 6, line 55, and insert the following claim:
-- 1.  Cabinet structure for receiving a television set having a fixed height and width, the structure comprising:

a pair of spaced apart towers defining a television set receiving area between the towers;

an adjustable spacing means spanning the towers for determining the horizontal distance between the towers, the spacing means including a pair of relatively shiftable end members, whereby the length of the adjustable spacing means may be regulated by shifting said end members with respect to one another to vary the size of the televison set receiving area in order to accommodate television sets of different widths; and an attachment means for connecting the spacing means with each of said towers. --

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 5,303,057
DATED : April 12, 1994
INVENTOR(S) : Davidow et al.

It is certified that error appears in the above-identified patent and that said Letters Patent is hereby corrected as shown below:

Column 6,
Line 40, cancel the text beginning with "1. Cabinet structure" to an ending "said towers" in column 6, line 55, and insert the following claim:
-- 1.   Cabinet structure for receiving a television set having a fixed height and width, the structure comprising:

a pair of spaced apart towers defining a television set receiving area between the towers;

an adjustable spacing means spanning the towers for determining the horizontal distance between the towers, the spacing means including a pair of relatively shiftable end members, whereby the length of the adjustable spacing means may be regulated by shifting said end members with respect to one another to vary the size of the televison set receiving area in order to accommodate television sets of different widths; and an attachment means for connecting the spacing means with each of said towers. --

This certificate supersedes Certificate of Correction issued April 19, 2005.

Signed and Sealed this

Nineteenth Day of July, 2005

JON W. DUDAS
*Director of the United States Patent and Trademark Office*